US009061263B2

(12) United States Patent
Summerton et al.

(10) Patent No.: US 9,061,263 B2
(45) Date of Patent: Jun. 23, 2015

(54) METHOD OF IMPROVING THE CRYSTALLINE PERFECTION OF DIAMOND CRYSTALS

(75) Inventors: Grant Charles Summerton, Norwood (ZA); John Olaf Hansen, Rouxville (ZA); Robert Charles Burns, Northcliff (ZA); Timothy Patrick Gerard Addison, Midrand (ZA); Simon Craig Lawson, Berkshire (GB); Keith Barry Guy, Buckinghamshire (GB); Michael Peter Gaukroger, Hampshire (GB)

(73) Assignee: ELEMENT SIX TECHNOLOGIES LIMITED, Harwell, Oxford (GB)

( * ) Notice: Subject to any disclaimer, the term of this patent is extended or adjusted under 35 U.S.C. 154(b) by 1493 days.

(21) Appl. No.: 11/721,355

(22) PCT Filed: Dec. 9, 2005

(86) PCT No.: PCT/IB2005/003719
§ 371 (c)(1),
(2), (4) Date: Nov. 9, 2007

(87) PCT Pub. No.: WO2006/061707
PCT Pub. Date: Jun. 15, 2006

(65) Prior Publication Data
US 2009/0258229 A1    Oct. 15, 2009

(30) Foreign Application Priority Data

Dec. 9, 2004    (ZA) .................................. 2004-9975
May 18, 2005    (ZA) .................................. 2005/4019

(51) Int. Cl.
*B01J 3/06*        (2006.01)
*B01J 3/08*        (2006.01)
*C01B 31/06*       (2006.01)

(52) U.S. Cl.
CPC ............ *B01J 3/062* (2013.01); *Y10T 428/2982* (2015.01); *B01J 2203/0655* (2013.01)

(58) Field of Classification Search
None
See application file for complete search history.

(56) References Cited

U.S. PATENT DOCUMENTS

| 5,908,503 | A  | * | 6/1999 | Sumiya et al. ................... 117/79 |
| 6,692,714 | B2 | * | 2/2004 | Vagarali et al. ............... 423/264 |
| 7,172,655 | B2 |   | 2/2007 | Twitchen et al. |
| 7,404,399 | B2 |   | 7/2008 | Sumiya et al. |

FOREIGN PATENT DOCUMENTS

| EP | 0 715 885 | 6/1996 |
| JP | 11-300194 | 11/1999 |

OTHER PUBLICATIONS

Sumiya, et al., "Development of High-Purity Synthetic Diamonds", Sumitomo Electric Technical Review, No. 39, pp. 69-73, XP000612899, 1995.
Pal'Yanov, et al., "High-quality synthetic diamonds for SR application", Nuclear Instruments & Methods in Physics Research, vol. 448, No. 1-2, pp. 179-183, XP004206524, 2000.
Jackson, et al., "Synthetic Diamond Strength Enhancement Through High Pressure/High Temperature Annealing", Materials Research Society, vol. 383, pp. 267-272, XP002950075, 1995.

* cited by examiner

*Primary Examiner* — Guinever Gregorio
(74) *Attorney, Agent, or Firm* — Oblon, McClelland, Maier & Neustadt, L.L.P.

(57) ABSTRACT

This invention relates to a method of improving the crystalline perfection of IIa diamond crystals by heating the grown diamond crystals at an elevated temperature and an elevated pressure. The invention extends to grown diamond material having a low extended defect density with low nitrogen concentration.

25 Claims, 4 Drawing Sheets

METHOD OF IMPROVING THE CRYSTALLINE PERFECTION OF DIAMOND CRYSTALS

INTRODUCTION

Figure 1A:
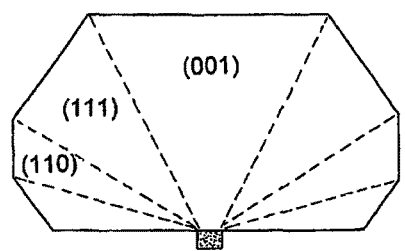

THIS invention relates to a method of producing diamond with improved crystalline perfection containing low levels of nitrogen.

BACKGROUND OF THE INVENTION

The synthesis of diamond by various methods is well known and well established. One such example is the synthesis of diamond under high pressure and high temperature (HPHT). There are two principle methods employed and both are from solution. The one method is a temperature gradient method and the other is an allotropic change method. In the temperature gradient method, the driving force for crystal growth is the supersaturation due to the difference in solubilities of source material and the growing crystal as a result of a temperature difference between the two. The carbon that is present in the higher temperature region migrates to the seed crystal, which is positioned in the lower temperature region, via a solvent/catalyst material that separates the source material and seed crystal. Such a temperature gradient method is described generally in U.S. Pat. No. 4,034,066.

Almost all diamond synthesised from solution contains nitrogen and is diamond of type Ib.

When growing diamonds of the type IIa, which have a nitrogen content generally lower than 5 ppm (parts per million by mass), removal of nitrogen from the starting materials is necessary. This is typically achieved by using a nitrogen getter. The nitrogen getter or agent is added to the solvent/catalyst, which is typically a molten alloy of the transition metals cobalt, iron and nickel. This agent has the effect of preferentially sequestering the nitrogen in the metallic melt, either as a solute or as a precipitated nitride or carbo-nitride. Such agents are typically elements like titanium, zirconium and aluminium.

Annealing is a method used in the field of materials science to improve the crystal domain size and perfection of the domains generally and is well known. Usually an elevated temperature is used but with no increased pressure. For example, U.S. Pat. No. 5,908,503 discusses the use of a high temperature furnacing stage, typically using temperatures of 1100 to 1600° C. and low pressures, using a non-oxidising atmosphere to improve the crystalline perfection of diamond. The non-oxidising atmosphere is a requirement to prevent the oxidation and loss of the diamond crystal during treatment. The process of U.S. Pat. No. 5,908,505 uses low pressures and the inventors thereof actively discourage the use of high pressures in the annealing process, as it is stated that defects are incorporated into a diamond crystal during the course of lowering the pressure and temperature back to normal temperature and pressure levels.

Annealing of extended lattice defects in diamond requires diffusion of carbon atoms. The diamond lattice is a very tightly bonded lattice and diffusion is restricted except under certain conditions. Increasing temperature increases diffusion, but increasing pressure generally reduces it. In type Ib diamond the presence of significant levels of nitrogen in the diamond significantly enhances diffusion. Although some prior art (V. D. Antsygin's article in Optoelectronics Instrumentation and Data Processsing (1998) No. 1 p 9) have shown an improvement on the crystalline perfection in BARS grown type Ib diamond on annealing at 2100° C., the extended defects and annealing mechanism in type Ib and IIa are quite different and the prior art teaches that it is very difficult to remove structural defects in diamond containing a low nitrogen concentration.

A need exists for a diamond material having a low density of extended defects (crystalline perfection) in combination with a low and controlled impurity levels and in particular low levels of nitrogen such as found in type IIa diamond. A further need exists for preparing such diamond, where crystalline perfection relates to minimizing the concentration of extended defects such as dislocations and stacking faults.

SUMMARY OF THE INVENTION

This invention is a single crystal diamond containing low levels of nitrogen and low extended defect density.

Primarily, the present invention relates to grown HPHT diamond material having a nitrogen concentration less than 5 parts per million (ppm), preferably <2 ppm, more preferably <0.5 ppm, most preferably <0.05 ppm and having an extended defect density as characterized by X-ray topography of below 400/cm$^2$, preferably below 300/cm$^2$, more preferably below 200/cm$^2$, most preferably below 100/cm$^2$ over an area of greater than 0.014 cm$^2$, preferably 0.1 cm$^2$, more preferably 0.25 cm$^2$, more preferably 0.5 cm$^2$, more preferably 1.0 cm$^2$, most preferably 2.0 cm$^2$.

The invention extends to a method of improving the crystalline perfection of a diamond containing low levels of nitrogen. In particular the method of the invention includes the step of heat treating the grown diamond at an elevated temperature and elevated pressure, typically at a temperature between 2100 and 2500° C. and a pressure of 6 to 8 GPa.

The temperature is preferably greater than 2150° C., more preferably greater than 2175° C., more preferably greater than 2200° C., most preferably greater than 2225° C.

The pressure is preferably greater than 6 GPa, more preferably greater than 6.5 GPa, more preferably greater than 7.0 GPa, more preferably greater than 7.2 GPa, most preferably greater than 7.4 GPa.

The pressure is preferably less than 8 GPa, more preferably less than 7.9 GPa, more preferably less than 7.8 GPa, more preferably less than 7.7 GPa, most preferably less than 7.6 GPa.

The heat treatment step typically takes place at a temperature of about 2200-2250° C. and a pressure of about 7.5 GPa.

In a preferred embodiment of the invention, the type IIa diamond is grown on a seed crystal by the temperature gradient method. The temperature gradient method of producing the synthetic type diamond with low nitrogen concentration involves providing a reaction mass of a source of carbon separated from seed crystals by a mass of solvent/catalyst and subjecting the contents of the capsule to conditions of elevated temperature in the diamond stable range such that a temperature gradient is established between the carbon source and the seed, with the seed being at the low end of this temperature gradient. A nitrogen getter is used to reduce the nitrogen content of the grown diamond.

In one preferred form of the invention, the carbon source and solvent/catalyst are treated to reduce the nitrogen content as far as possible and preferably below 1 ppm.

The carbon source may be any known in the art including diamond which may be CVD (chemical vapour deposition) or HPHT diamond, or natural diamond, but is typically graphite.

The solvent/catalyst may be any known in the art but is preferably cobalt, iron or nickel or combinations of two or more such metals or alloys containing one or more such metals.

According to a further aspect of the present invention the invention, there is provided a method of growing a diamond crystal comprising the steps of
- selecting a seed with a major face of the required orientation and having the desired perfection against criteria that might include type, shape, size, morphology, strain as deduced by birefringence and extended defect concentration as might be determined by X-ray topography,
- loading the seed (or seeds) with the major face oriented substantially parallel to the surface of a suitable support in such a way that the major face is substantially normal to the direction of the greatest flux of carbon nutrient species and will give rise to a preferred growth sector, preferably a central growth sector,
- carrying out growth in an HPHT environment for a sufficient time to ensure that a crystal of suitable size and height is grown,
- recovering the crystal,
- Using X-ray or other suitable techniques to identify the locations of highest crystalline quality
- Optionally annealing at elevated temperature this crystal under conditions of high pressure,
- Selecting a plate sufficiently far from the seed such that it contains the region of highest crystalline quality (as determined by X-ray or other techniques). The plane of the plate will typically be parallel to the major face of the seed crystal and contain a proportion of the central growth sector originating from the preferred face of the original seed crystal, the plate including a zone of high perfection corresponding to the area where the plate intersects the preferred growth sector, and, and
- Removing said chosen plate using techniques such as mechanical or laser sawing and preparing the surfaces using techniques such as lapping or scaif polishing,
- further enlarging and improving the zone of high perfection diamond in this plate by means of high temperature annealing under high pressure, and
- optionally further improving crystalline quality in the zone of high perfection by repetition of one or several of the above mentioned steps, Preferably the chosen growth sector is either the cubic (001) growth sector or the octahedral (111) growth sector.

Preferably the support is a ceramic carrier (or seedpad).

In a preferred embodiment of the invention, type IIa diamond is grown on a seed crystal by the temperature gradient method.

In a preferred embodiment the seed will preferably have a major face with a near planar surface of good finish (low roughness) and orientation close to the true crystal plane {001}. There are two ways in which this may be accomplished and both are presented. Firstly the crystal may be sawn from a larger crystal of high perfection and further it should be sawn from a single growth sector of such a crystal. This has been argued in for instance U.S. Pat. No. 5,908,503 Sumiya et al. This may then be referred to as a single sector seed with cubic morphology (all faces {100}). In practice the seed must be sawn and the major face must be polished. Inevitably this leads to misorientation and subsurface damage to the seed crystal with the result that the subsequent HPHT growth process is less effective. This difficulty may lead to the situation where the seed must first be partially dissolved first in the solvent/catalyst metal before growth of a good quality crystal can start (as has been discussed in U.S. Pat. No. 4,836,881 Satoh and Tsuji). This type of processed seed may also be taken from single crystal CVD diamond material of suitably high perfection, as determined by methods such as X ray topography.

Secondly, and alternatively, the seed may be a selected HPHT crystal of small size, such as 0.5 mm, that has been grown so as to achieve the presence of one or more major as-grown faces of good perfection. In the same way that, during growth of large diamond crystals (one carat or more) the dislocations are constrained very largely to the directions {110} and the stacking faults lie in the planes {111}, we find that during the growth of smaller crystals from a microscopic seed, the dislocations in such a crystal lie very largely in the eight spokes that represent the intersection of the {111} planes, and that there are relatively few dislocations in the (001) sectors. Higher strain as observed by cross polarised light indicate the <110> directions which do not intersect the cubic face which is selected to have higher perfection. In a similar way, an octahedral face of higher perfection may be selected by inspection and the use of polarised light microscopy.

The seed might be processed or as grown, the material might be synthetic type Ib or IIa (HPHT or CVD) or natural in origin, the preferred option being a seed that has low stress and also low, or no, surface defects. These criteria can be met by careful selection such as assessing the seed for stress using crossed polarised light microscopy or similar techniques (Metripol) and by processing using techniques such as scaif polishing, plasma processing, reactive ion etching (RIE) or ion beam machining. A preferred method is to make use of selection methods in order to select near perfect crystals. The selection process is carried out in part during the processing of materials from the large volumes of crystals that are generated in the production of crystalline diamonds for abrasive applications. The selection is based on the following steps:
(1) Shape sorting so as to reject poor and cracked crystals
(2) Magnetic sorting to reject crystals containing metallic inclusions
(3) Sieve screening to ensure a narrow size range typically 500 to 550 microns
(4) Visual sorting to reject poor surfaces, with use of polarised light microscopy
(5) Selection of suitable major (001) surfaces.

The seeds so selected may be processed further using cleaning processes such as the use of hot oxidizing acid mixtures.

The seeds may be annealed under stabilizing pressures at temperatures as high as 2500° C.

The above requirements on the seed can result in the selection of as few as 1 in 20 000 crystals as being suitable for a seed.

Optical Application Motivation

There is a range of optical devices which, as a result of their unique requirements, place high demands on the material used for them. Examples include laser windows, where high intensity beams need to pass undisturbed through a window which is required to provide some form of isolation, and other devices such as optical reflectors, diffraction gratings and etalons.

Depending on the particular application, key properties that may play a role in the selection or manufacturing of an appropriate material include low and uniform birefringence, uniform and high refractive index, low induced birefringence or refractive index variation as a function of strain, low and uniform optical absorption, low and uniform optical scatter, high optical (laser) damage threshold, high thermal conductivity (minimising temperature variation within the optical element), an ability to be processed to show a high surface polish together with high parallelism and flatness, mechanical strength, abrasion resistance, chemical inertness, and repeatability in the material parameters so that it is reliable in the application.

By way of an example, the birefringence property is a measure of the optical isotropy of the material. Diamond is a cubic material and by definition this means that perfect diamond is optically isotropic (i.e. showing no birefringence). However in practice the isotropy is disturbed by defects that introduce strain into the lattice. If the strain is homogeneous then the material remains optically uniform. Such a uniform strain might be associated with a uniform density of point defects, such as that which might be introduced by nitrogen or boron containing diamond, where the nitrogen and/or boron defects are present but are evenly distributed through the bulk of the diamond. However, in practice defects such as stacking faults and dislocations often give rise to non uniform strain. Minimizing these types of defects is achieved in material prepared according to the methods of this invention thereby giving improved performance in the application.

Other Example Applications

It is obvious to those in the field that the material of this invention will have many benefits in other applications. Such as for example, mechanical wear applications where any non-uniformity in the material or stress might lead to reduced lifetime.

Use as a substrate material for SC CVD diamond growth.

Synthetic diamond material of high crystalline perfection of the current invention may also be of value for ornamental applications such as jewelry.

Other applications include use as a window and/or detector material in monitoring and controlling synchrotron radiation. The most important trend in synchrotron radiation X-ray sources is towards higher brilliance, i.e. higher rate photon streams out of smaller optical source sizes, in smaller solid angles and shorter pulses, leading to a very high power density, of the order of hundreds of watts per square millimeter at the beam optical elements. These elements are typically windows, polarisers, filters and monochromators, where the elements most likely to suffer from the high power density are the first monochromator crystal (normally in a double crystal set-up; often cooled with liquid nitrogen) and the window(s) between source and monochromator, which is the first to be hit by the X ray beam. When using the currently preferred material, silicon, which can be grown to a very high crystal perfection, it is possible to build optical elements that preserve transversal coherence in the X ray beam which is important for phase sensitive imaging experiments like holotomography, X-ray photon correlation spectroscopy or coherent diffraction imaging. Diamond would be the preferred material because of its thermal properties and damage resistance if the crystal perfection (bulk and surface) could be improved [G. Grubel, D. Abernathy, G. Vignaud, M. Sanchez del Rio and A. K. Freund, "A diamond double-crystal transmission monochromator", Rev. Sci. Instrum. 67 (9) 1996, 1-4.]

DETAILED DESCRIPTION OF PREFERRED EMBODIMENTS

The crux of the invention is the improvement of the crystalline perfection of a synthetic diamond, more especially a synthetic diamond with low nitrogen concentration prepared by the method of HPHT synthesis using a temperature gradient method. The improvement of the lattice perfection of this synthetic diamond can be measured by methods such as X-ray topography, X-ray rocking curve width measurements, or direct measurement of the density of dislocations and other defects which give rise to features in images such as white beam X-ray topographs. These dislocation densities are typically expressed in units of dislocations per square cm of image area. An improvement in terms of the invention would be the reduction from a level of 100,000 dislocations per $cm^2$ to a level of 100 dislocations per $cm^2$. Using a rocking curve width method, an improvement would typically be represented as a reduction in the full width at half maximum from a value of 7 arc secs (where a second is 1/60 of a minute and a minute is 1/60 of an angular degree) to a value approaching the theoretical limit for diamond which is 1 arc second.

As mentioned previously, some of the prior art actively teaches away from using high pressures when annealing synthetic diamond. However, diamond is a metastable phase at pressures of less than 5 GPa (the stabilising pressure is itself dependent on the temperature as shown in the classical thermodynamic analyses of Berman and Simon for example), but for annealing temperatures of 1300° C., 5 GPa is the required pressure. It has now surprisingly been found that the process of annealing is improved in extent and efficiency by the application of pressures above the minimum stabilising pressure. In accordance with the invention, the annealing of one or more synthetic diamond pieces having low nitrogen concentration, which have been selected so as to have the correct qualities for successful annealing, is carried out at conditions of high pressure and temperature.

It is surprising that the use of stabilizing pressures and these temperatures is beneficial on the crystalline perfection. Annealing of extended lattice defects in diamond requires diffusion of carbon atoms. The diamond lattice is a very tightly bonded lattice and diffusion is restricted except under certain conditions. Increasing temperature increases diffusion, but increasing pressure generally reduces it. In type Ib diamond the presence of significant levels of nitrogen in the diamond significantly enhances diffusion compared with low nitrogen containing type IIa diamond. Although some prior art have shown an improvement on the crystalline perfection in type Ib diamond on annealing at 2100° C., the extended defects and annealing mechanism in type Ib and IIa are quite different and the prior art, teaches that it is very difficult to remove structural defects in diamond containing low nitrogen concentration. The precise details of the mechanism which occurs in the experimental procedure described here is not certain. Our work found that the best conditions for this occurred at temperatures above 2200° C.

In order to carry out the annealing process, diamond samples are compacted into a cylindrical disc of low-shear strength material (such as an alkali-halide) in such a way that they are completely enclosed within the packing medium. The disc, which now contains the samples to be treated, is then encapsulated within a graphite container, which is in turn encased within two tantalum cups.

The container is then loaded into a HPHT (high pressure high temperature) chamber, which is designed to fulfill the functions of pressure chamber and furnace for the attainment of the extremely high pressure and temperature conditions required.

A HPHT press of the belt type is an example of a HPHT system that can be used for carrying out the annealing step. It is to be understood, however, that other HPHT systems can also be used, provided they are able to achieve the required high pressure and temperature conditions.

Typical conditions for heating these structures are temperatures of 1600 to 2500° C., preferably about 2200° C., with stabilising pressures ranging between 6.0 and 8.0 GPa, preferably about 7.5 GPa. Treatment times may vary between 0.1 and 48 hours, but would preferably be 4 hours.

In accordance with the invention, the crystalline perfection of suitable type synthetic diamond with low nitrogen concentration can be improved by the method of the invention. This improvement is of value in the preparation of diamond optical materials for use in technical applications such as synchrotron beam lines, for example.

In HPHT synthesis of single crystal diamond material, HPHT-grown diamond seed crystals are generally pressed into a seed pad in a way such that a major face of the seed lies in the plane of the surface of the seed pad. Research by the applicant on synthesis and characterisation of HPHT synthetic diamond material teaches that in order to produce HPHT-grown diamond material that is of high crystalline quality it is important to start from a seed which has a major face that has a crystallographic orientation such that, in subsequent growth, extended defects (such as dislocations and stacking faults) do not propagate normal to that major face. If this condition is met any extended defects that either nucleate at the seed surface or thread though from within the seed will propagate away from the central region of the subsequently grown material, leaving it relatively free of extended defects. If the material is grown to a thickness (measured in the direction normal to the major face of the seed crystal) that is large compared to the lateral dimensions of the seed crystal, the last material to be grown will have a relatively large central region, opposite the seed, that is free of extended defects that emanate from the seed or its surface.

It is advantageous if the directions of propagation of structural defects have only small components parallel to the normal to the seed crystal's major face. The smaller these components are, the more rapidly the area free of extended defects emanating from the seed will increase in area as the crystal is grown thicker.

We have found that under typical conditions used for HPHT synthesis of diamond material, dislocations tend to propagate in directions close to <110>. Stacking faults lie in {111} planes.

This means, for example, that a {110} oriented surface is a poor choice for the major face of a seed crystal because dislocations would propagate normal to the {110} surface of the seed crystal and, in addition, two of the {111} stacking fault planes would be perpendicular to the {110} surface of the seed crystal. Thus a region of low extended defect density would never form.

{001} is a relatively good choice for the major face of a seed crystal. There are two <110> directions that lie in the {001} plane and two that lie at an angle of 45.0 degrees to it. This means that dislocations that nucleate at the seed surface or thread through from within the seed will propagate out sideways away from the central region of growth as the crystal is grown thicker. The normal of the {001} surface lies at an angle of 35.3 degrees relative to each of the {111} stacking fault planes and therefore stacking faults will also propagate out sideways as the crystal is grown thicker, leaving a central region of growth which is free of both dislocations and stacking faults emanating from the substrate or its surface.

Similar arguments can be applied to growth on {111} surface. The angle between the <110> dislocation directions and the normal to the {111} surface is 35.3 degrees. The normal of the {111} surface lies at an angle of about 19.5 degrees relative to three of the {111} stacking fault planes. This both stacking faults and dislocations are expected to propagate away from the central region above the seed as the crystal grows thicker. Clearly the smaller angle for the stacking faults means that the area of the higher crystal quality central region increases more slowly with thickness.

Clearly this must be combined with the ability to grow diamond material in which extended defects such as dislocations and stacking faults do not nucleate with a high frequency. Dislocations might nucleate within growing material when foreign material becomes included in the crystal, for example. The applicant's research has indicated that the likelihood of stacking fault nucleation is higher for <111> growth sectors than other sectors. For that reason, with a {001} major seed face it is additionally advantageous to choose growth conditions that cause the central <001> growth sector and any minor sectors (such as <511> and <311>) that surround it to enlarge as rapidly as possible as the sample grows thicker. This reduces the effect of stacking fault and dislocation nucleation within {111} sectors. For many applications, including the use of material as a substrate for CVD diamond growth, it is desirable to have type IIa material and the exclusion of nitrogen makes it harder both to achieve high growth rates and to control the morphology to minimise the lower crystal quality <111> sectors so that a high crystal quality region of significant area can be achieved in a short time.

The location and extent of the regions of high crystal quality can be assessed directly using X-ray projection topography that allows stacking faults and dislocations to be directly imaged. When there is confidence that the central sector is of high crystal quality because of the reasons given above, it is possible to choose the region for production of high quality material by imaging the material using DiamondView™. This uses above band gap radiation to excite luminescence cause by low concentrations of point defects in the material. These defects are incorporated differently on the different surfaces and this gives rise to differences in the photoluminescence from different growth sectors. In so far as there is a correlation between the growth sectors and the regions of high crystal quality (as described above), DiamondView™ can be used to allow the selection of the central <001> sector and the minor sectors surrounding it for production of high crystal quality products that exclude the lower quality <111> sectors.

The area of the high crystal quality region can be increased by HPHT annealing (at 2200° C. or at higher temperatures under diamond stabilising pressure) that removes stacking faults in the <111> growth sectors. When the crystal quality of the <111> sectors have been improved by annealing in this way it is advisable to use X-ray topography that directly images the extended defects to select the appropriate area for processing samples. DiamondView™ imaging will no longer be so reliable for optimising the chosen area because it will now be desirable to include material from <111> sectors.

Removal of the stacking faults in the absence of significant nitrogen could be due to one of (or a combination of) several physical processes. The pressure exerted on the diamond sample inside the capsule is unlikely to be perfectly hydrostatic (equal in all directions). This is supported by the fact that some diamond samples annealed in capsules, in which the sample length in one dimension is greatly different to the length in the other two, have a propensity to crack. Given this, there is then likely to be a resolved shear stress on the {111} planes on which the stacking faults exist. Since stacking faults are in general bounded by partial dislocations, the shear forces present, in combination with the high temperature, could cause these dislocations to move in such a manner that the stacking faults are eliminated. One way in which this could occur is by glide: the shear force causes glide of a partial dislocation across the {111} glide plane containing the stacking fault, thereby correcting the error in the lattice. That the sample is also at high temperature would likely increase the glide velocity, thus increasing the chances of producing an observable effect. Another way in which pressure and temperature could cause motion of the dislocations bounding the stacking fault is by climb: the high temperature increases the rate of absorption or emission of vacancies or interstitials required to move the dislocations non-conservatively. In this way, it could be envisaged that the boundaries of the stacking faults shrink completely, thus removing the fault. Stacking faults are metastable arrangements of the crystal so removal thereof lowers the total energy.

Figure 1B:
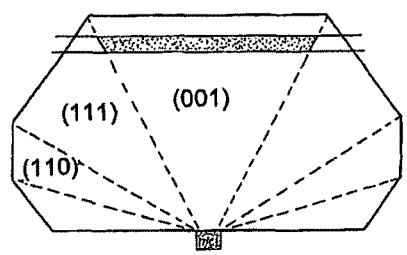
Figure 2:
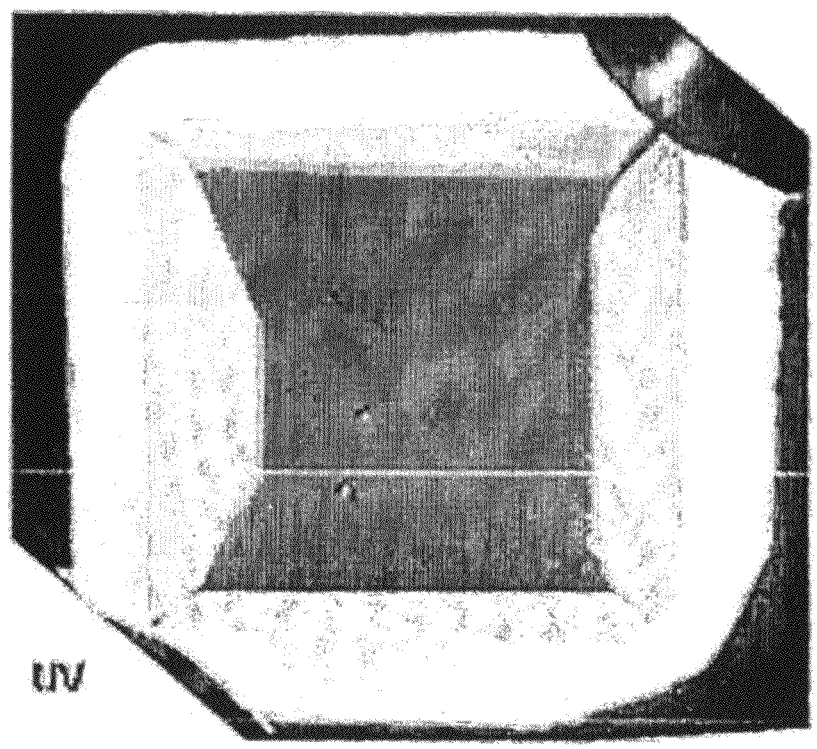
Figure 3A:
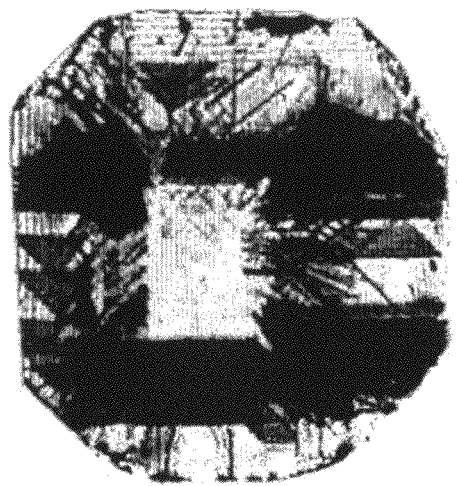
Figure 3B:
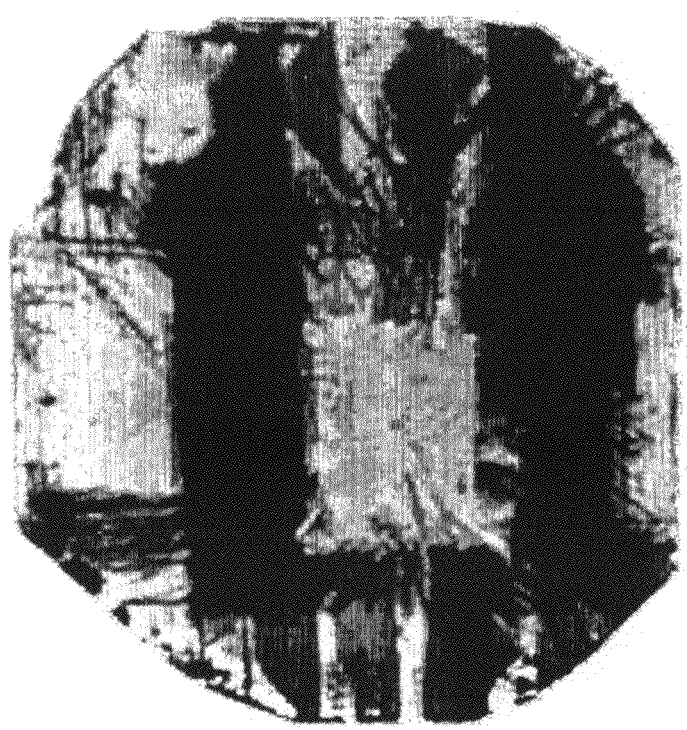
Figure 4:
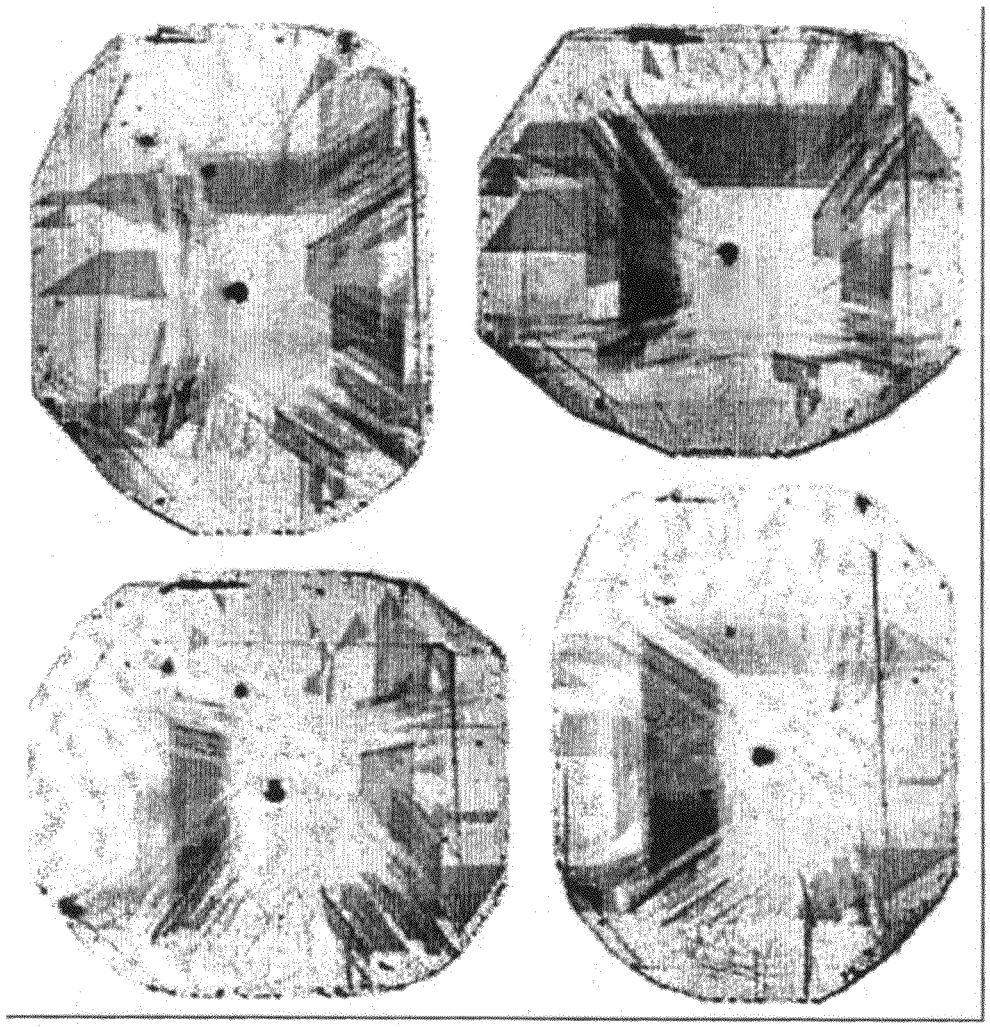

The invention will now be described with reference to the following examples and Figures in which:

FIG. 1a is a schematic diagram of growth sectors in synthetic diamond grown from a <100> oriented seed at HPHT. For this geometry that stacking faults and extended defects lie predominantly in the growth sectors outside of the central {100}. For simplicity minor growth sectors such as {113} and {115} are ignored in this example;

FIG. 1b is the same diagram as FIG. 1a but indicating a plate cut through the preferred growth sector with a zone of high perfection indicated by the grayed area;

FIG. 2 is a UV fluorescence image taking using Diamond-View of a horizontal section (growth direction being out of the plane of the paper) showing a central region of higher purity and lower fluorescence (the darker region). In some instances this can be used to aid in selecting the zone with the highest crystallinity. Although it should be emphasised that there are occasions when low fluorescence does not correspond to the highest crystalline purity;

FIGS. 3a and 3b are {220} projection topographs using synchrotron irradiation of plate described in Example 1 prior to annealing. The zone of highest crystalline purity is the central rectangle found near the centre of the plate. The dark areas are associated with a high density of dislocations and stacking faults; and FIG. 4 is {111} projection topographs of Example 1 after annealing at 2200° C. with stabilizing pressure. The density of the stacking faults and possibly dislocations has been reduced. The black spots present in all images are associated with dirt/damage on the sample surface.

The process of growth of synthetic diamond from a solution of carbon in a metallic melt proceeds by addition of layers of carbon atoms onto pre-existing surfaces of diamond, starting at the so-called seed. From FIG. 1 it is clear that there are different facets of the crystal growing at any one time. These could comprise the cubic face, defined by Miller indices (001), the octahedral face defined by Miller indices (111), the dodecahedral face defined by Miller indices (110) and additional minor faces which are less important. The atomic arrangement on each of these faces is slightly different. In particular, the atomic density, and the frequency and orientation of the atomic bonds which terminate at the surface are different. There are subtle differences in the growth processes at each of these faces giving rise to differences in the growth rate and the uptake of foreign atoms or even macroscopic inclusions at each of these faces. For this reason, there will be differences in the properties of the crystal within the crystal depending upon the orientation of the layers at the time of emplacement in the crystal. This is best demonstrated by making a polished section of the crystal so as to include the axis of growth and by using ultraviolet light to illuminate the section. The slight differences in luminescence properties are usually strong enough to delineate the so-called growth sectors, zones of the diamond which share a common orientation of growth layers. See FIG. 2.

EXAMPLE 1

Based on the method of the invention a HPHT stone was grown with a low nitrogen concentration using the temperature gradient method from an as grown synthetic type Ib HPHT seed. The parent population from which the crystal was drawn was firstly mechanically sorted so as to achieve an improved material. The sorting was done by magnetic selection so as to eliminate crystals with metallic inclusions. Further sorting was done by shape selection using a vibrating table so as to improve the shape factor of the crystals, in effect selecting euhedral crystals. Further sorting was carried out using a system of screening with a small size interval between the screen sizes, typically so as to achieve a particle with size not more than 550 microns and not less than 500 microns. Finally the smaller quantity of crystals, processed by the steps as outlined above, was examined by a skilled worker so as to select suitable crystals and so as to select the one preferred face of the crystal, having the preferred orientation, such a the (001) orientation. The selection was made on the basis of crystal perfection, quality of the surface and edges and the absence of strain as revealed by, for instance, polarised light microscopy. The chosen seed was therefore preferred because of selected according to its measured birefringence, shape, morphology and size.

A number of seeds, selected and prepared as described above was used in the HPHT (high pressure high temperature) synthesis of type IIa diamond crystals as is known in the art, using a solvent catalyst of iron and cobalt and using additives that are known in the art and that have the effect of preventing nitrogen uptake in the diamond crystal. The HPHT process was carried out at a pressure of 5 GPa and at temperatures from 1260° C. to 1330° C. The time of growth was 200 hours.

After growth the crystals were released from the solidified matrix of solvent/catalyst metals and selected for crystal quality. One such HPHT diamond with a weight of three carats was then characterized to be type IIa and having a nitrogen concentration less than 2 parts per million (ppm) using Fourier transform infrared spectroscopy (FTIR). The morphology of this stone showed both major and minor facets, but had an external morphology that indicated the prevalence of the preferred growth sector, most typically the (001) or cubic growth sector.

This preferred stone with low nitrogen concentration was processed by mechanical sawing and scaif polishing into three samples with typical thickness 0.5 mm. One of these plates was further examined. The plates were examined using DiamondView™ or an equivalent ultraviolet fluorescence microscope for the existence of well defined growth sectors, including the preferred sector that had been grown from the selected seed face.

The sample was examined prior to annealing using synchrotron topography (FIG. 3). The {001} plate sample was placed in the beam line with the normal to the plane nominally parallel to the X-ray beam but slightly inclined so that the {220} planes diffract the beam onto the X-ray detector. The two synchrotron topographs in FIG. 3 were formed with (220) and (2-20) refraction planes. The small inclination of the sample in the beam produces a relatively small amount of projection distortion.

X-ray topographs were recorded with a laboratory X-ray set after the sample had been HPHT annealed at 2200° C. for 1 hour under diamond stabilising pressure. The four {111} projection topographs in FIG. 4 were recorded using the four different {111}. Three of the topographs have been rotated so that approximately the same view of the sample is seen in each case to make it easier to compare the contrast seen from particular regions of the sample, allowing for the fact that there is slightly different projection distortion in each case.

The black dots on the post-anneal images are caused by surface features that have probably resulted from the HPHT treatment. These regions of strain do not pass into the bulk of the sample and the corresponding material could therefore be polished off. The stacking faults are the dark trapezoidal and triangular features incorporating fringes. Contrast does not arise from stacking faults in a given X-ray topograph where the direction of lattice deformation lies in the diffracting plane, but the combined pair of {220} synchrotron topographs and the combined set of {111} topographs should both show all of the stacking faults present in the sample, making it possible to determine whether the HPHT annealing treatment has changed the stacking faults in any way.

The images show that stacking fault sizes and positions have been affected by the annealing treatment. There are regions within the top 20% and bottom 20%, but excluding the right-hand 25%, in which the stacking faults have been largely removed. The bottom 20% of the sample is also relatively free from stacking faults after the treatment. The prominent stacking faults visible one fifth of the way up the first pre-anneal topograph have been removed by the treatment allowing the clear central area to be extended downwards. The density of extended defects as determine by X-ray techniques measured over a 2×2 mm$^2$ area was <300 cm$^2$.

The invention claimed is:

1. Grown high pressure-high temperature (HPHT) synthetic diamond material with a nitrogen concentration less than 5 parts per million having a density of dislocations and stacking faults as characterized by X-ray topography of below 400/cm$^2$.

2. The grown HPHT synthetic diamond material according to claim 1 wherein the density of dislocations and stacking faults is below 300/cm$^2$.

3. The grown HPHT synthetic diamond material according to claim 2 wherein the density of dislocations and stacking faults is below 200/cm$^2$.

4. The grown HPHT synthetic diamond material according to claim 3 wherein the density of dislocations and stacking faults is below 100/cm$^2$.

5. The grown HPHT synthetic diamond material according to claim 1, wherein an area having a density of dislocations and stacking faults as characterized by X-ray topography below 400/cm$^2$ is greater than 0.014 cm$^2$.

6. The grown HPHT synthetic diamond material according to claim 1, wherein t an area having a density of dislocations and stacking faults as characterized by X-ray topography below 400/cm$^2$ is greater than 0.1 cm$^2$.

7. The grown HPHT synthetic diamond material according to claim 1, wherein an area having a density of dislocations and stacking faults as characterized by X-ray topography below 400/cm$^2$ is greater than 0.25 cm$^2$.

8. The grown HPHT synthetic diamond material according to claim 1, wherein an area having a density of dislocations and stacking faults as characterized by X-ray topography below 400/cm$^2$ is greater than 0.5 cm$^2$.

9. The grown HPHT synthetic diamond material according to claim 1, wherein an area having a density of dislocations and stacking faults as characterized by X-ray topography below 400/cm$^2$ is greater than 1.0 cm$^2$.

10. The grown HPHT synthetic diamond material according to claim 1, wherein an area having a density of dislocations and stacking faults as characterized by X-ray topography below 400/cm$^2$ is greater than 2.0 cm$^2$.

11. The grown HPHT synthetic diamond material according to claim 1, wherein the nitrogen concentration is less than 4 ppm.

12. The grown HPHT synthetic diamond material according to claim 1, wherein the nitrogen concentration is less than 2 ppm.

13. The grown HPHT synthetic diamond material according to claim 1, wherein the nitrogen concentration is less than 0.5 ppm.

14. The grown HPHT synthetic diamond material according to claim 1, wherein the nitrogen concentration is less than 0.05 parts per million (ppm).

15. The grown HPHT synthetic diamond material according to claim 1, wherein the diamond material is type IIa.

16. A method of improving the crystalline perfection of a grown diamond according to claim 1 with a nitrogen concentration less than 5 ppm including the step of heating the grown diamond at an elevated temperature of between 2150 and 2500° C. and elevated pressure of 6 to 8 GPa.

17. A method according to claim 16 wherein the temperature is greater than 2200° C.

18. A method according to claim 17 wherein the temperature is greater than 2225° C.

19. A method according to claim 16 wherein the pressure is greater than 7.0 GPa.

20. A method according to claim 16, wherein type IIa diamond is grown on a seed crystal by the temperature gradient method.

21. A method according to claim 16, wherein the type IIa diamond is grown on a seed crystal by the temperature gradient method and getters are used.

22. A method according to claim 16, wherein the grown diamond is heated at elevated temperature for between 0.1 and 48 hours.

23. A method according to claim 16, where a solvent catalyst is used.

24. A method according to claim 16, where iron cobalt is used in the solvent catalyst.

25. A method according to claim 16, where iron nickel is used in the solvent catalyst.

* * * * *